United States Patent
Bottura

(10) Patent No.: US 6,685,230 B1
(45) Date of Patent: Feb. 3, 2004

(54) RAPID CONNECTION FOR TUBES

(75) Inventor: Olindo Bottura, Brescia (IT)

(73) Assignee: OLAB S.r.l., Torbole Casaglia (IT)

( * ) Notice: Subject to any disclaimer, the term of this patent is extended or adjusted under 35 U.S.C. 154(b) by 0 days.

(21) Appl. No.: 09/626,050

(22) Filed: Jul. 26, 2000

(51) Int. Cl.⁷ .............................. F16L 17/00
(52) U.S. Cl. ........................ 285/39; 285/340
(58) Field of Search ............ 285/39, 308, 340, 285/111

(56) References Cited

U.S. PATENT DOCUMENTS

| | | | | |
|---|---|---|---|---|
| 3,561,793 A | * | 2/1971 | Rode | 285/111 X |
| 4,288,113 A | * | 9/1981 | Saulnier | 285/340 X |
| 5,160,179 A | * | 11/1992 | Takagi | 285/39 X |
| 5,487,572 A | * | 1/1996 | Combot-Corrau et al. | 285/340 X |
| 5,695,224 A | * | 12/1997 | Grenier | 285/340 X |

* cited by examiner

*Primary Examiner*—Greg Binda
(74) *Attorney, Agent, or Firm*—Fitzpatrick, Cella, Harper & Scinto

(57) ABSTRACT

A device for connecting tubes which comprises a housing 6 having an enclosed area 15 in which the crown of a spring washer 4 is enclosed such that the washer may rotate without translation A tube 20 can fit into the housing to be gripped by elastic teeth 11 which are distributed around the crown of the washer. The tube 20 may thereafter be released from the washer when a release lever 3 is pressed against the teeth 11 to bend them back away from the tube.

13 Claims, 1 Drawing Sheet

RAPID CONNECTION FOR TUBES

FIELD OF THE INVENTION

The present invention concerns a rapid fitting for tubes, in particular a connection fitted with a toothed spring washer for gripping the tube.

STATE OF THE ART

At present there are several rapid fitting devices which enable tubes to be connected to each other or tubes to mechanical devices such as boilers, solenoid valves, tanks, distributors, etc.

These devices have in common:

The possibility of inserting the end of the tube into the fitting in one single operation, guaranteeing at the same time a seal and locking of the tube itself;

The possibility of disconnecting the tube by means of a double operation consisting in applying pressure on the fitting and pulling the tube outwards from the fitting;

The presence of a seal (O-ring or other).

These fittings also have in common:

A lever element which, when pressed, allows the tube to be extracted from the fitting;

A spring element for gripping the tube;

A supporting element of the spring element.

These elements may be present only in part, in that some of them may carry out several functions at the same time: for example, the lever element may also act as the tube gripping element.

Therefore, the state of art as regards to rapid fittings can be summarised into the following two types.

Fittings where the release lever element and the tube gripping element form one component. It is made up of axial spring brackets of almost the same length or longer than the diameter of the element itself. This type of fitting is usually without the other elements in that the functions of containing the top and bottom of the release element are performed by the particular undercuts machined directly inside the body of the fitting.

Fittings where the lever and gripping elements are separate. In this case, the former is similar in all fittings, as it has a cylindrical shape with a front nosepiece which interacts with the gripping element and a flange operated by the user. The gripping element is, on the other hand, usually a spring washer equipped with teeth (or petals) positioned in a radial formation, oriented towards the inside, that is towards the external surface of the tube, and shaped similar to the toothed washers used as an anti-unscrewing device for screws.

The fittings of the first type have the drawback of using only the elasticity of the seal as a means of producing an opening of the tube gripping element when the tube requires to be disconnected, so much so that this causes a lowering of performance when, over a period of time, the seal loses its elasticity and wears, sometimes making it impossible to extract the tube when operating the release element.

SUMMARY OF THE INVENTION

The present invention involves an incorporated spring washer type rapid fitting for tubes, but achieved using a new combination and shape of the elements and where the spring washer is exploited in an original way enabling the fitting to be user friendly, more efficient and ensuring safe locking of tube inserted into it.

BRIEF DESCRIPTION OF DRAWINGS

Further details of the invention will however become more evident as the description evolves with reference to the enclosed indicative and not binding drawings, in which.

A DETAILED DESCRIPTION OF A PREFERRED EXECUTION

Figure 1:
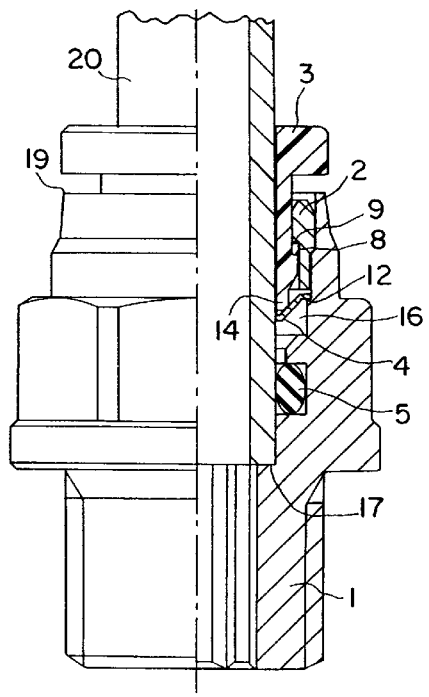
FIG. 1 shows, a partial longitudinal cross-section of the fitting applied to a tube.

The fitting proposed here is made up essentially of a body 1, a guide ring nut 2, a pin or release lever 3, a toothed spring washer 4 and a toric seal 5.

The body 1 and the guide ring nut 2 are usually brass; the pin or release lever 3 is high slip capacity plastic (POM); the toothed spring washer 4 is high tensile steel; the O-ring type seal 5, is an elastomer.

As can be seen from the drawings, the body 1 is machined to form a housing 6, for the most part stepped and shaped to receive the operating components of the fitting and inside the former the end section of a tube 20 to be locked. The guide ring nut 2 is placed at the entrance of said housing 6 of the body 1; the spring washer 4 is placed at the internal face of said ring nut, between the latter, the body and the tube 20 to be locked; the seal 5 is positioned further inside in the body 1, between the latter and the external surface of the tube 20. The release lever 3 is positioned and guided internally to the ring nut 2, between the latter and the tube, and has a nose 14 pointing towards and interacting with the spring washer 4. Furthermore at the bottom of the housing 6 the body 1, has a circular supporting shoulder 17 for the internal end of the tube 20 and this shoulder has a hole 18 which is coaxial to the tube when the latter is inserted into the fitting.

The device in question carries out the function as a connection between tubes or between a tube and a mechanical element; therefore it must guarantee both its sealing and tube locking capacities, so as to avoid release while under pressure during normal working conditions, and release due to accidental pulling of the tube.

The seal 5 guarantees sealing and the toothed spring washer 4 locking of the tube.

The most salient feature of this type of realization is the fact that the housing 6 in the body 1 is executed so as to house the seal 5 and to create a cylindrical chamber 16 necessary for the grip spring washer 4 directly in the body 1 of the fitting, eliminating in this way a component normally present in fittings executed using this technology, which is the lower support bushing for the spring element.

The assembly sequence is as follows:

Seal 5;

Spring washer 4;

Ring nut 2.

These elements are held axially in their housings by coining the top lip 19 of the body.

The final assembly operation consists in inserting the release lever 3 in the ring nut of the fitting, where it is held by a locking claw 8 which engages an undercut 9 present on the inside of the ring nut 2.

Figure 4:
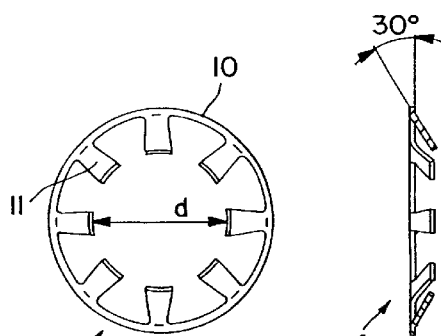
FIGS. 4 and 5 show two views, one front on and the other from the side of the tube lock spring washer.
Figure 5:
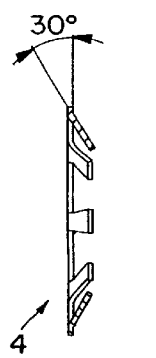

The spring washer 4, as shown in FIG. 4, is made up of a circular crown 10 from which the gripping teeth 11 stem in a radial formation towards the center and slope at an angle of 30° in relation to the plane of the circular crown, facing in the opposite direction to the release direction of the tube 20.

The internal diameter d of these teeth is less than the external diameter of the tube which is to be inserted into the fitting so as to form the necessary engaging conditions.

A prerogative of the fitting is that the circular crown 10 of the spring washer 4 is positioned between the ring nut 2 and a step 12, specifically machined in the body 1.

Figure 2:
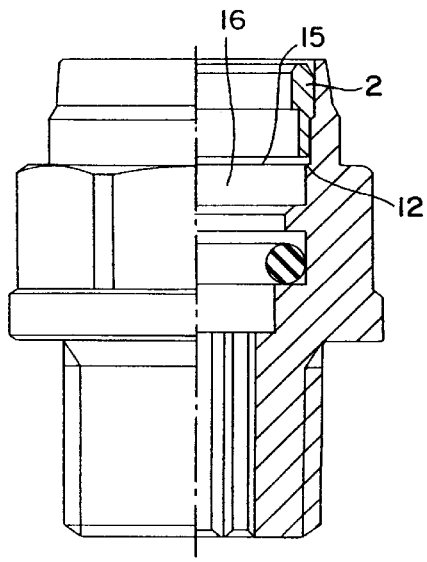
FIG. 2 shows, a partial cross-section of the body of the fitting complete with seal and ring nut acting as guide and housing for the release lever.
Figure 3:
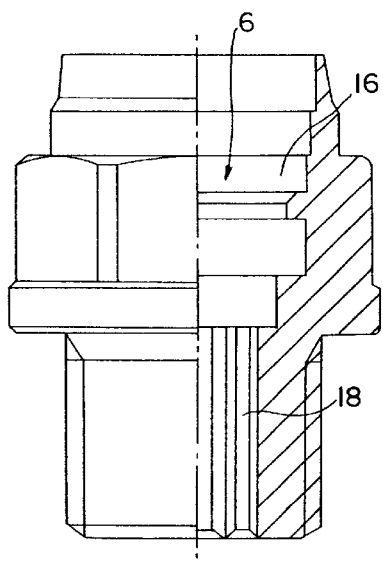
FIG. 3 shows, once more as a partial cross-section, only the body of the fitting.

When the fitting is assembled, the spring washer 4 in this way is within an area or housing 15 defined by the space enclosed between the ring nut 2 and the step 12 in the body, as shown in FIG. 2.

The enclosed area 15 of the circular crown of the spring washer 4 is slightly higher than the thickness of the latter; in this way the spring washer 4 has the possibility of turning on its axis, but cannot translate either internally or externally.

The freedom of the spring washer 4 to rotate is another of the essential requirements for this type of fitting, in that, should the tube turn, the spring washer 4, by turning together with it, does not cut it, as happens with fittings where the tube gripping element is stationary in relation to the body of the fitting.

When the tube is inserted into the fitting, the contact existing with the internal diameter d of the teeth 11 causes them to divaricate and flex in relation to their bases moving away from the external diameter of the tube.

The cylindrical chamber 16, machined in the body, on a level with the washer 4, has the task of allowing the teeth 11 to move freely around their base.

The elasticity of the teeth 11, due to the high yield point of the material with which the spring washer 4 is made, holds them tightly pressed against the external wall of the tube in correspondence with their sharp edge.

An attempt to extract the tube by pulling it in the opposite direction to the one used to insert it, will form a small cut in the external surface of the tube causing the teeth to become entangled.

If the attempt to pull out the tube continues, the teeth 11 bend in the opposite direction to the one caused by the tube being inserted, and therefore reduce the size of the opening for the tube: the more the tube gets pulled the more the teeth react to it.

The release lever 3 in a case such as this, carries out the important role of stopping the teeth 11 from bending back and given that the teeth rest against the nose 14 of the release lever, of stopping them from bending right back over.

In order to release the tube and extract it from the fitting, the release lever 3 has to be pressed right down and at the same time the tube pulled out.

The lever 3, in this phase, divaricates the teeth 11 more than the inserted tube has already done, causing them to bend further until an opening is created which is wider than the external diameter of the tube itself.

In short, the following innovative aspects can be found in the fitting described above.

In the spring washer, the crown is undeformable, the teeth bent individually, capable of turning around their root and slope at an angle of 30° in relation to the plane of the circular crown.

Furthermore, the spring washer is held in the body by only one element, the ring nut, lodged in a circular housing which allows it to rotate without however allowing it to carry out any substantial axial translation.

What is claimed is:

1. A fitting for connecting an object, said fitting comprising:
   a body formed with a housing which has an entrance, said housing being formed with an enclosed area;
   a guide ring nut placed at said entrance;
   a toothed spring washer comprising a circular crown from which elastic gripping teeth extend in radial formation towards a center, said spring washer being positioned in said enclosed area formed in said housing, with said circular crown being located beneath said guide ring nut and said elastic teeth extending from said circular crown to press tightly against an object fitted into said housing, said enclosed area being higher than a thickness of said circular crown such that said spring washer may turn on its axis in said housing, wherein said circular crown of said spring washer when in a gripped condition is constrained in said enclosed area, and wherein said circular crown is formed with a radial extension extending away from said center, said radial extension serving as a support for said teeth and said radial extension not being co-planar with said teeth; and
   a release lever disposed inwardly of said guide ring nut and guided thereby for axial movement with respect to said housing, said release lever having a nose which, upon axial movement of said release lever, contacts said teeth and flexes them with respect to said circular crown to release said teeth from gripping arrangement with an object being gripped by said teeth.

2. A fitting according to claim 1, wherein said circular crown rests on a step in said housing opposite to said guide ring nut to prevent axial translation of said toothed spring washer.

3. A fitting according to one of claim 1 or 2, wherein said housing is circular and holds said circular crown coaxial to an object which fits in said housing.

4. A fitting according to claim 3, wherein said release lever functions to divaricate said teeth of said toothed spring washer.

5. A fitting according to claim 2, wherein said release lever functions to divaricate said teeth of said toothed spring washer.

6. A fitting according to claim 1, wherein said release lever functions to divaricate said teeth of said toothed spring washer.

7. A fitting according to claim 6, wherein an object which extends into said housing is locked therein by said toothed spring washer.

8. A fitting according to claim 1, wherein an object which extends into said housing is locked therein by said toothed spring washer.

9. In combination:
   a tube; and
   a fitting for connecting said tube, said fitting comprising:
   a body formed with a housing which has an entrance into which said tube extends, said housing being formed with an enclosed area;
   a guide ring nut placed at said entrance;
   a toothed spring washer comprising a circular crown from which elastic gripping teeth extend in radial formation towards a center, said spring washer being positioned in said enclosed area formed in said housing, with said circular crown being located beneath said guide ring nut and said elastic teeth extending from said circular crown to press tightly against said tube, said enclosed area being higher than a thickness of said circular crown to permit said spring washer to turn on its axis in said housing, wherein said circular crown of said spring washer when in a gripped condition is constrained in said enclosed area, and wherein said circular crown is formed with a radial extension extending away from said center, said radial extension serving as a support for said teeth and said radial extension not being co-planar with said teeth; and a release lever disposed inwardly of said guide ring nut and guided thereby for axial movement with respect to said housing, said release lever having a nose which, upon axial movement of said release lever, contacts said teeth and flexes them with respect to said circular crown to release said teeth from gripping arrangement with said tube being gripped by said teeth.

10. A combination according to claim 9, wherein said housing includes a toric seal between said body and said tube.

11. A combination according to claim 10,
wherein said elastic teeth lock said tube to said body, and
wherein said seal seals said tube with respect to said body.

12. A combination according to claim 9, wherein said release lever extends between said guide nut and said tube.

13. A combination according to claim 12, wherein said guide nut extends between said release lever and said housing.

* * * * *